United States Patent
Nolan

[19]

[11] Patent Number: 5,810,157

[45] Date of Patent: Sep. 22, 1998

[54] CONVEYOR APPARATUS FOR TRANSPORTING A WORKPIECE WITH A VARIABLE DRIVE FORCE

[76] Inventor: John Nolan, 39283 E. Archer, Harrison Township, Mich. 48045

[21] Appl. No.: 782,833

[22] Filed: Jan. 13, 1997

Related U.S. Application Data

[63] Continuation of Ser. No. 389,176, Feb. 15, 1995, abandoned.

[51] Int. Cl.[6] .................................................. B65G 13/06
[52] U.S. Cl. ........................................ 198/781.04; 464/44
[58] Field of Search ........................ 198/781.02, 781.04; 464/42, 43, 44

[56] References Cited

U.S. PATENT DOCUMENTS

| | | | |
|---|---|---|---|
| 4,275,572 | 6/1981 | Holmes et al. | 198/781.04 |
| 4,286,441 | 9/1981 | Scheneman, Jr. et al. | 198/781.02 |
| 4,325,474 | 4/1982 | Rae | 198/781.02 |
| 4,327,563 | 5/1982 | Allmacher, Jr. | 464/37 |
| 4,421,224 | 12/1983 | Dingman | 198/781.02 |
| 4,508,212 | 4/1985 | Bolle et al. | 464/48 X |
| 4,524,861 | 6/1985 | Matsushita | 198/781.04 |
| 4,832,656 | 5/1989 | Rado | 464/40 |
| 5,012,920 | 5/1991 | Wakefield | 198/781.04 X |
| 5,107,982 | 4/1992 | Walter | 198/781.04 |
| 5,147,024 | 9/1992 | Yamada | 198/781.04 X |
| 5,188,215 | 2/1993 | Riezler | 198/781.02 |

FOREIGN PATENT DOCUMENTS

| | | | |
|---|---|---|---|
| 2726593 | 12/1977 | Germany | 464/42 |

*Primary Examiner*—F. J. Bartuska
*Attorney, Agent, or Firm*—Joseph G. Burgess

[57] ABSTRACT

A roller assembly for use with a conveyor for transporting a workpiece wherein the drive force applied by the roller is adjustable independent of the force generated by placing a workpiece on the roller. The roller includes an inner sleeve secured to a drive shaft of the conveyor. A roller is disposed about the inner sleeve and is frictionally fit along an interface between the roller and an inner sleeve such that when a weight is placed upon the roller, the frictional force occurring between the interface between the roller and sleeve causes the rotating inner sleeve to impart motion to the roller thus moving the workpiece. The roller includes a connection to the inner sleeve such that the coupling or frictional force between the roller and the inner sleeve is independently variable of any force generated by placing a workpiece on the roller.

12 Claims, 4 Drawing Sheets

5,810,157

CONVEYOR APPARATUS FOR TRANSPORTING A WORKPIECE WITH A VARIABLE DRIVE FORCE

This is a Continuation of U.S. patent application Ser. No. 08/389,176, filed Feb. 15, 1995 now abandoned.

BACKGROUND OF THE INVENTION

1. Field of the Invention

The present invention relates to a roller for use in a conveyor system and, more particularly, to a roller having an adjustability feature to vary the drive force of the roller.

2. Description of the Related Art

Conveyors having a plurality of rollers arranged to be driven by a chain or other driving element such that the rollers are capable of accumulating workpieces that may be moved forward and stopped in succession at the delivery end of the conveyor are known. The rollers are connected to a shaft such that they are not rigidly connected, but are free to rotate on the shaft and are connected only through friction.

The amount of force driving the workpieces therefore is a function of the amount of frictional force that exists between the roller and the drive shaft that it resides upon.

SUMMARY OF THE INVENTION

Accordingly, the present invention is a unique roller assembly for use with a conveyor for transporting a workpiece wherein the drive force applied by the roller is adjustable independent of the force generated by placing a workpiece on the roller. In general, the roller includes an inner sleeve and a means for securing the inner sleeve to a drive shaft of the conveyor. A roller is disposed about the inner sleeve and is frictionally fit along an interface between the roller and an inner sleeve such that when a weight is placed upon the roller, the frictional force occurring between the interface between the roller and sleeve causes the rotating inner sleeve to impart motion to the roller thus moving the workpiece. The roller includes a means for connecting said roller to the inner sleeve such that the coupling or frictional force between the roller and the inner sleeve is independently variable of any force generated by placing a workpiece on the roller.

One advantage of the present invention is that a drive force of the conveyor may be adjusted depending upon the weight of the workpiece.

DESCRIPTION OF THE PREFERRED EMBODIMENT(S)

Figure 1:
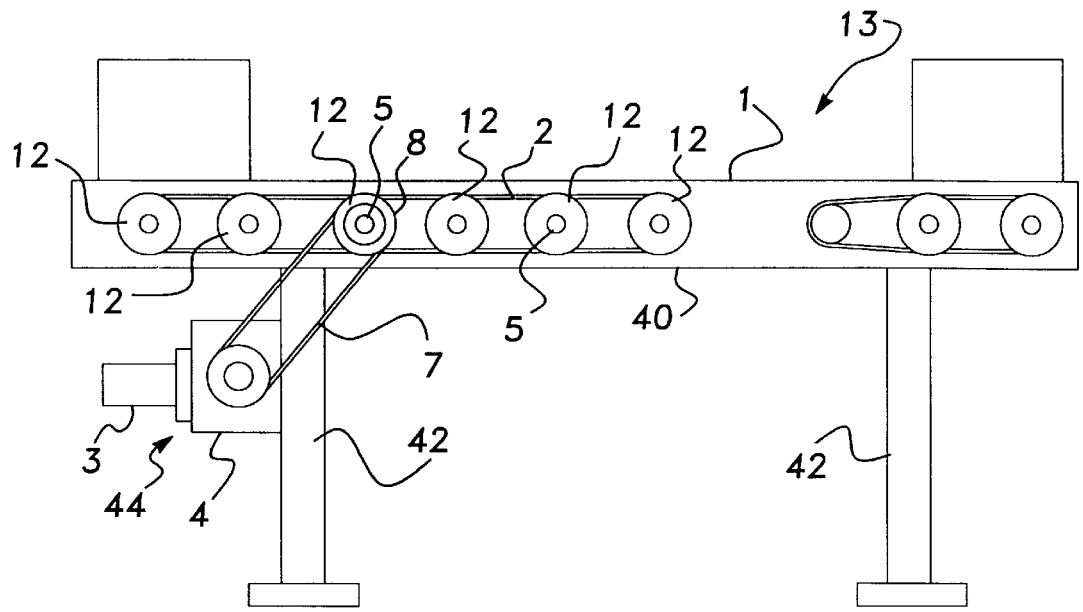
FIG. 1 is a side view of a conveyor utilizing a roller according to the present invention.
Figure 2:
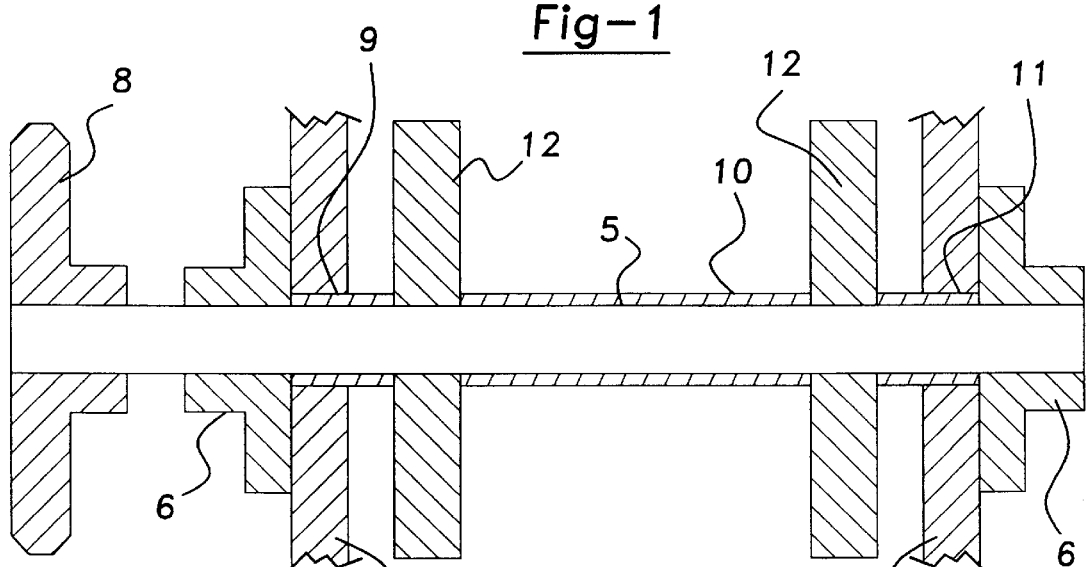
FIG. 2 is a partial top view of a conveyor showing the rollers mounted to a single shaft, according to the present invention.

Referring to the drawings, and more particularly, FIG. 1 and 2 thereof, a conveyor seen generally at 13 of a kind having a plurality of rollers 12, some or all of which are driven by a chain 2, or other drive means so as to cause a workpiece (not shown) resting on them to be conveyed along the length of the conveyor.

With this type of conveyor, the rollers may be driven continually but if removal of workpieces from the delivery end of the conveyor does not keep pace with the supply end, the goods will accumulate or collect at the delivery end of the conveyor. The total force required to hold back the queue of workpieces accumulated on the conveyor is the sum of the individual forces of each of the workpieces accumulated on the conveyor.

This type of conveyor relies on the friction at each individual roller to provide the drive means to advance the item along the path of the conveyor. Since the amount of friction is one of the least understood engineering principles, the amount of drive force is continuously changing over time. If the drive force is too little, the item will not advance down the length of the conveyor, and if it's too great, it will cause unnecessary stress on both the workpieces and the mechanism that is holding the queue at the delivery end of the conveyor.

As shown in FIG. 1, the conveyor includes a frame 40, supported by leg members 42, having parallel-spaced side members 40a and 40b. A drive means seen generally at 44, including an electric motor 3, a reducer 4, and a drive chain 7 is secured to one of the leg members 42. As shown in FIG. 1, some or all of the rollers 12 are connected by a common drive chain 2 which connects the rollers 12 so that they can be driven equally. FIG. 2 depicts a driven shaft 5, supported by bearings 6, through a drive sprocket 8 engaged with the driven chain 2, spacers 9, 10, 11 position the rollers 12. The elimination of the spacers is often desirable since it can offer increased flexibility in the final alignment of the roller.

Figure 3:
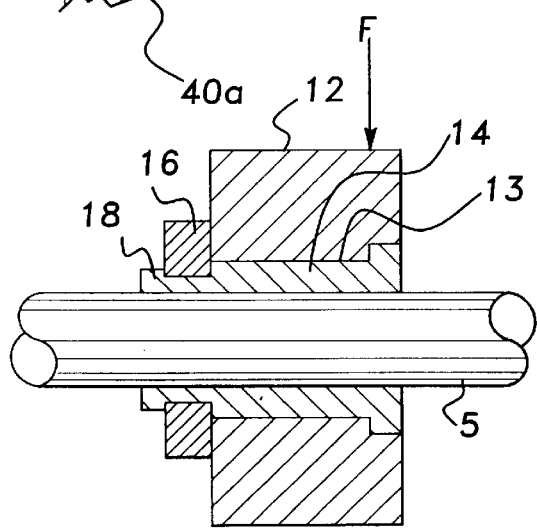
FIG. 3 is a cross-sectional side view of a prior art roller.
Figure 4:
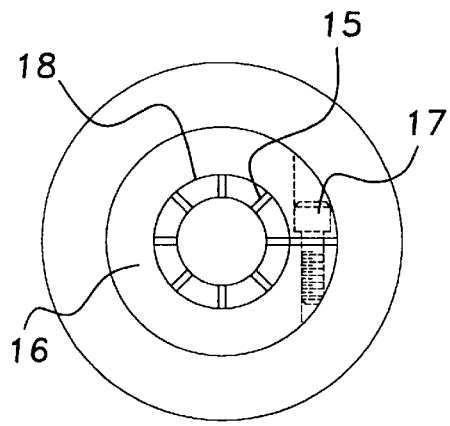
FIG. 4 is a side view of a prior art roller.
Figure 5:
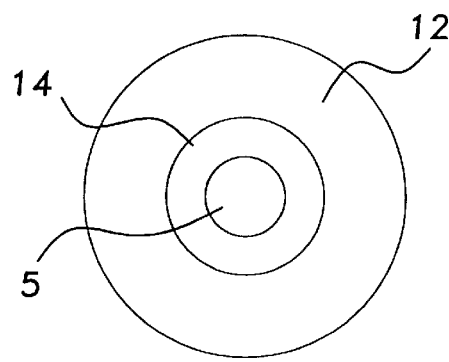
FIG. 5 is an opposite side view of a prior art roller.
Figure 6:
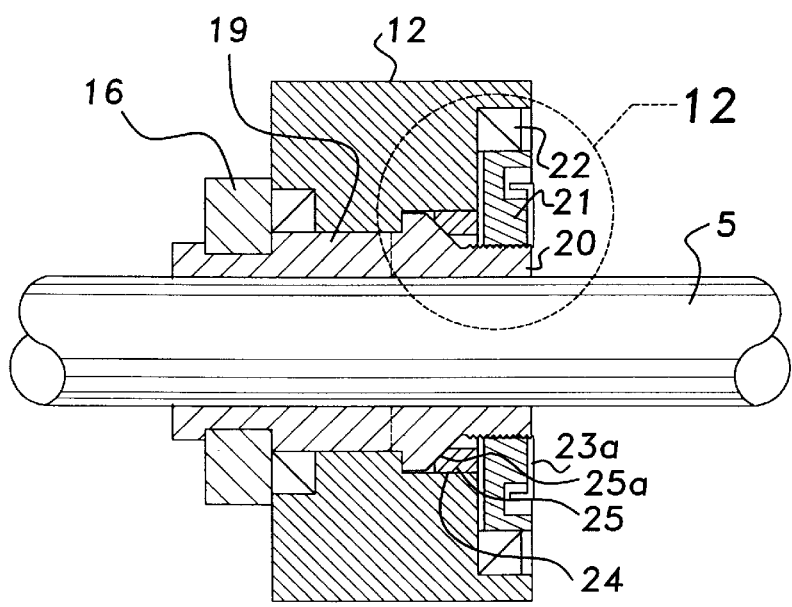
FIG. 6 is a cross-section of a roller according to the present invention.
Figure 7:
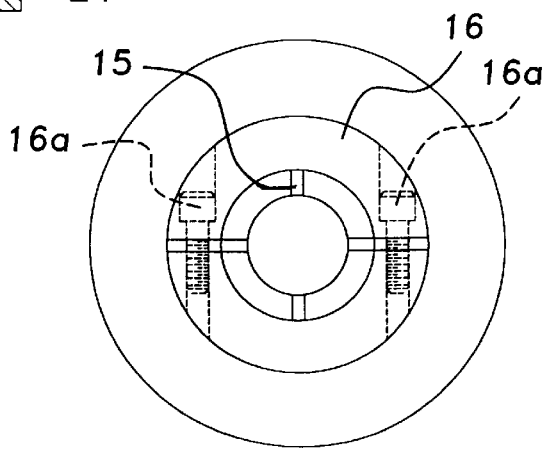
FIG. 7 is a side view of the roller of FIG. 6.
Figure 8:
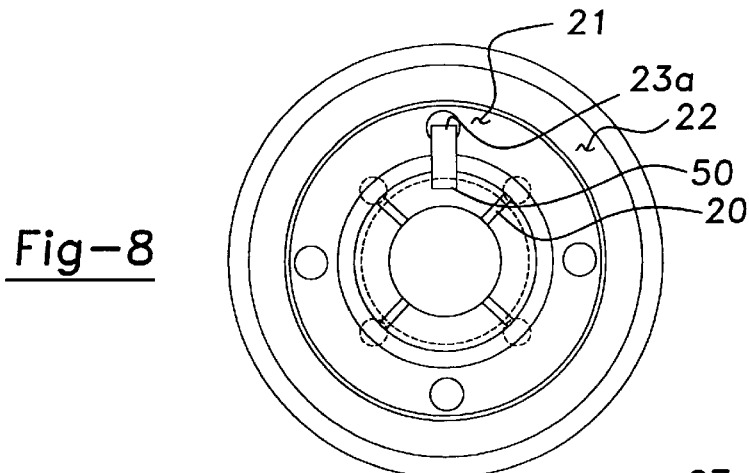
FIG. 8 is an opposite side view of the roller of FIG. 6.

FIGS. 3, 4 and 5 illustrate a prior art means of clamping the roller directly to the shaft without the use of the spacers 9, 10 and 11 shown in FIG. 2. Referring to FIG. 3, an inner sleeve 14, featuring radial serrations 15 shown in FIGS. 3 and 4, is clamped to the shaft 5 by way of a split clamp collar 16 through clamping screw 17 causing the fingers 18 on the inner sleeve 14 to be urged in contact with shaft 5. Such a mounting arrangement attaches the inner sleeve 14 to the shaft 5 such that the inner sleeve 14 rotates with the shaft 5. Such a split finger mounting arrangement is known. The roller 12 is mounted over the inner sleeve 14 and contacts the inner sleeve at the frictional interface 13. As the force F (see FIG. 3) increases, the frictional force occurring at the frictional interface 13 will also increase thus causing the roller 12 to rotate with the inner sleeve 14 and shaft 5. Thus, the greater the weight of the workpiece and the corresponding force applied to the roller 12, the greater the drive force of the roller 12. If the drive force becomes too great, it can cause unnecessary force on both the workpieces and the holding mechanism which holds the workpieces on the conveyor if and when they stack up at the delivery end.

FIGS. 6–8 and 12, 12a and 12b illustrate a first embodiment of the invention. An inner sleeve 19 may or may not feature serrations 15 or serrations 20. If serrations 15 are used they may be urged to lock the shaft through clamping collar 16 and fasteners 16a. Inner sleeve 19 may have additional serrations 20 shown at the opposite end of the inner sleeve 19. Either set of serrations 15, 20 are capable of locking the sleeve 19 to the shaft 5. Serrations 20 are urged into contact by a tapered locking nut 21. Additionally, the nut 21 is locked in position by a deforming lock washer 23. A tab a of the washer 23 is shown in dotted lines in its deformed position. The tab a is positioned in one of the four orifices a on the locking nut 21 to prevent rotation of the locking nut 21. The washer 23 is secured from rotation by disposing the tab a within a channel 50 on the threaded portion 19a of the inner sleeve 19. The locking nut 21 performs an additional function of urging a beveled clamp ring 25 against an inclined surface 19b thereby causing the clamp ring 25 to be urged outward against an interior surface 24 of the roller 12. The clamp ring 25 is urged upward by contact of the beveled portion 25a of the clamping ring with the inclined surface 19b of the inner sleeve 19. The clamp ring 25 is also radially split 25b (FIG. 12b) to allow the clamp ring 25 to expand as it is urged along the inclined surface 19b of the inner sleeve 19. Engagement of the clamp ring 25 with the interior surface 24 of the roller 12 creates an additional frictional force on the roller 12. This force is independent of the weight of the item that is being conveyed on the conveyor. A seal 22 is placed between the roller 12 and the locking nut 21.

Mathematically, the driving force (in pounds) for the items being conveyed on the prior art conveyors can be shown to be:

$$\text{Force} = \text{Weight} * M\mu * (Id/Od)$$

Where weight is the total weight (lb.)
$M\mu$=the coefficient of friction
Id=the inside diameter of the roller
Od=the outside diameter of the roller The equation for the driving force of the roller as set forth in the first embodiment of the invention as well as that disclosed in the second embodiment is as follows:

$$\text{Force} = \text{Weight} * M\mu * (Id/Od) + K$$

Where weight is the total weight (lb.)
$M\mu$=the coefficient of friction
Id=the inside diameter of the roller
Od=the outside of the roller; and
K is the force applied through the urging of the clamp ring 25 against the interior surface 24 of the roller 12.

Figure 9:
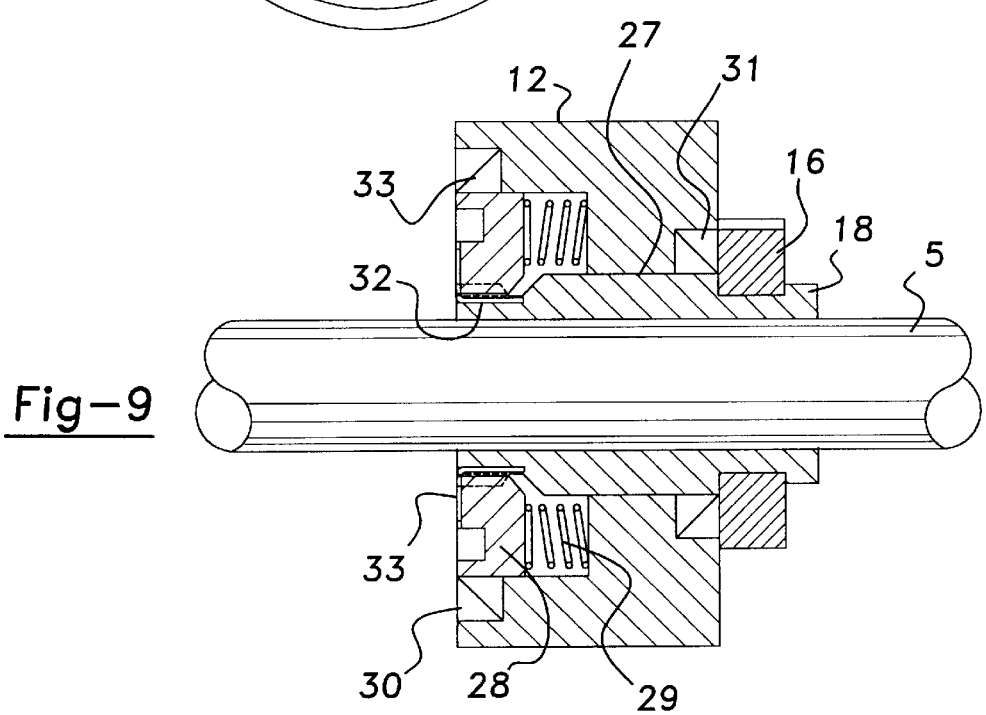
FIG. 9 is a roller according to a first alternative embodiment of the invention.
Figure 10:
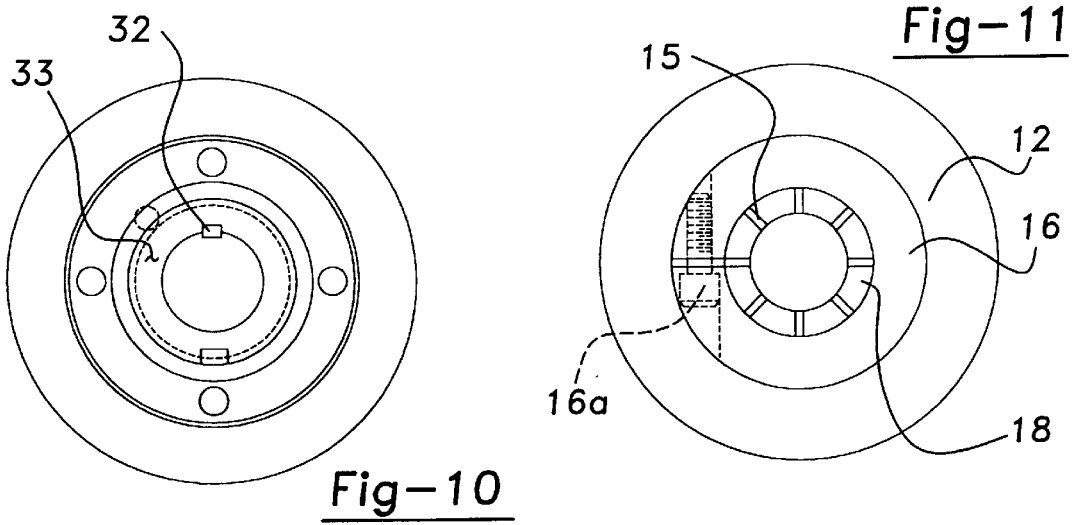
FIG. 10 is a side view of FIG. 9.
Figure 11:
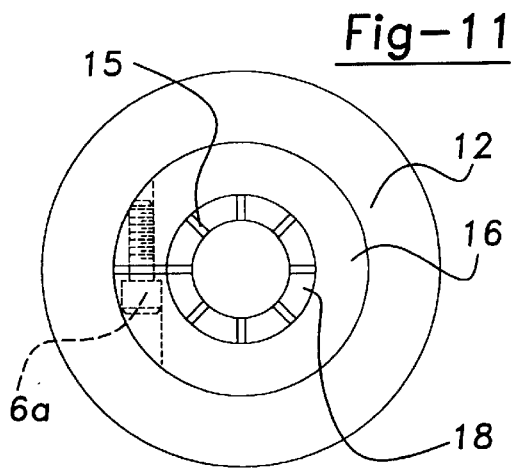
FIG. 11 is an opposite side view of FIG. 9.
Figure 12:
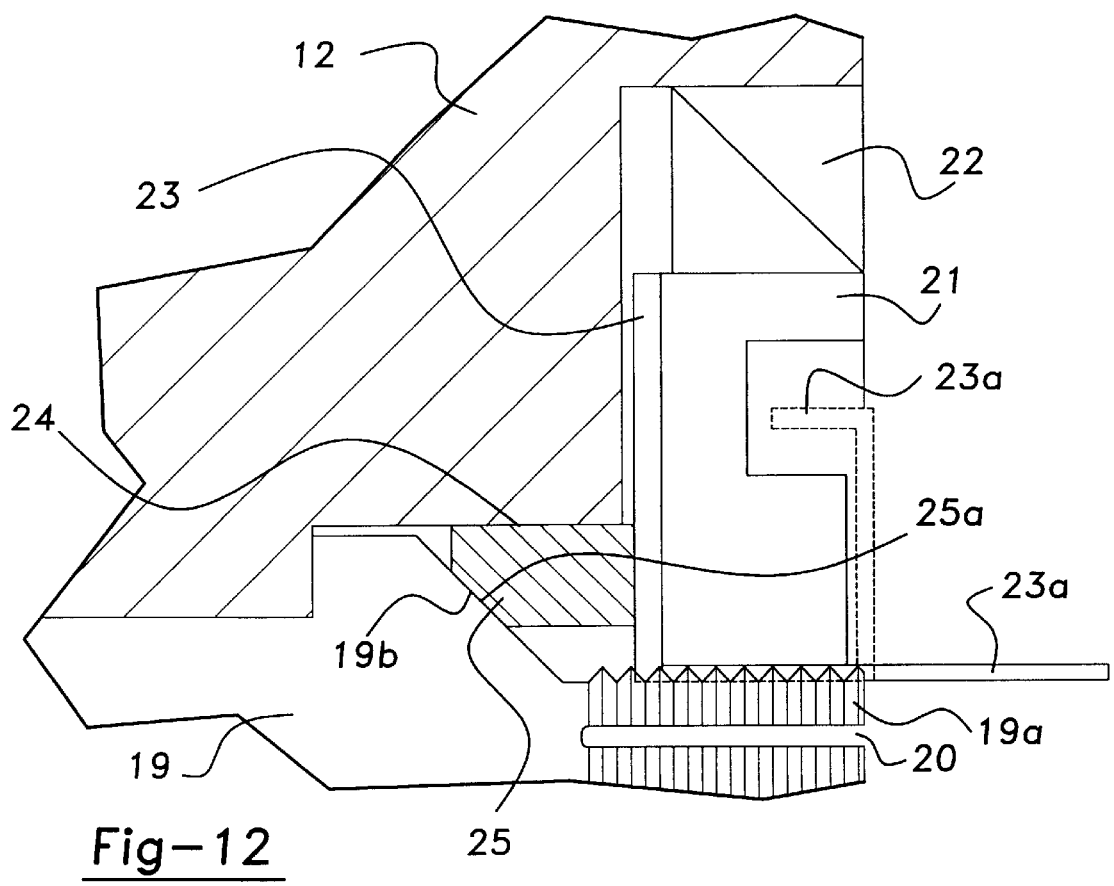
FIG. 12 is an enlarged view of a section of a roller according to a first embodiment as set forth in FIG. 6.
Figure 12A:
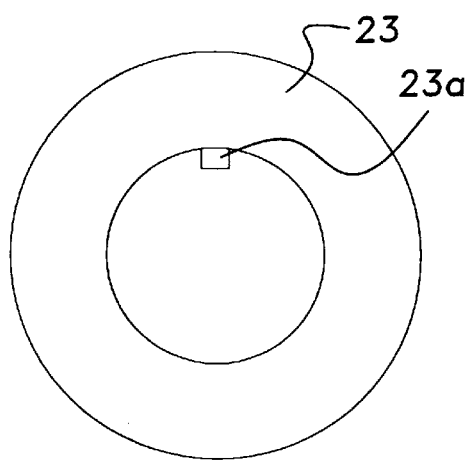
FIG. 12a is a side view of a washer according to the present invention.
Figure 12B:
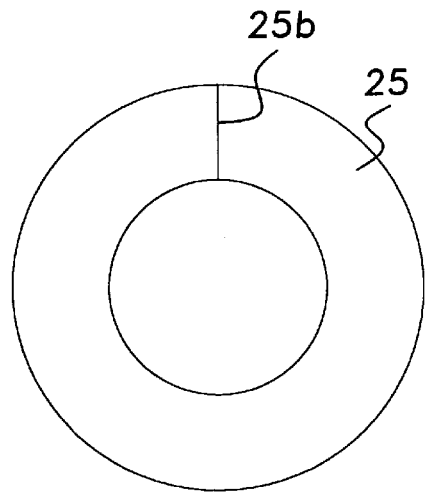
FIG. 12b is a side view of a clamp ring according to the present invention.

This can be extremely important for conveying relatively light-weight parts. As illustrated, the equation for the drive force now contains two separate components, one of which is dependent on the weight of the item being conveyed and the second is a variable that is independent of the weight being conveyed. Hence, for very light objects it is common to have too little drive force, but for heavy items it is quite probable that the drive force will be excessive. Therefore, by adjusting the locking nut 2, the amount of drive force can be infinitely varied. FIGS. 9–11 show an alternate embodiment where the inner sleeve 27 is clamped to the shaft 5 through serrations 15 by a lock collar 16 and threaded fasteners 16a. As set forth above, roller 12 rides on the inner sleeve 27 and is frictionally connected to the shaft 5. The adjustable friction force is applied through an adjustment screw 28 which compresses a spring 29 to exert a force against the roller 12. Such an arrangement increases the drive force in a manner similar to that described for the first embodiment. The adjustment screw 28 is locked in place through locking washer 32 and the roller 12 may be sealed by use of seals 31 and 33.

As set forth above, the disclosed embodiments set forth a roller apparatus for use with a conveyor assembly which provides a means to adjust the drive force of each roller independent of the force resulting from the weight of the workpiece.

I claim:

1. A roller assembly for use with a conveyor for transporting a workpiece comprising:
   an inner sleeve;
   means for securing said inner sleeve to a driven shaft of said conveyor;
   a roller disposed about said inner sleeve;
   means for coupling said roller to said inner sleeve such that the coupling force between said inner sleeve and said roller is independently variable of any force generated by placing a workpiece on said roller; said means including a beveled clamp ring acting against an inclined surface of said inner sleeve and a lock nut urging said beveled clamp ring against said inclined surface wherein said clamp ring acts against an interior surface of said roller to create an additional friction force on the roller.

2. A roller assembly for use with a conveyor having a driven shaft comprising:
   an inner sleeve, said inner sleeve having a threaded portion;
   a clamping collar disposed over said inner sleeve and securing said inner sleeve to said driven shaft such that said inner sleeve rotates with said driven shaft;
   a roller disposed about said inner sleeve; and
   a lock nut moveable on said threaded portion to vary the friction force between the roller and the inner sleeve.

3. A roller assembly as set forth in claim 2 including a beveled clamp ring positioned on said inner sleeve, said lock nut urging said beveled clamp ring against an inclined surface of said inner sleeve to create an additional friction force on the roller.

4. A roller assembly as set forth in claim 3 including a washer positioned between said lock nut and said roller, said washer including a tab engaging the lock nut to fix the position of the lock nut.

5. A roller assembly as set forth in claim 2 wherein said threaded portion of said inner sleeve includes a serration and said lock nut is tapered wherein as said lock nut is tightened on said threaded portion, the lock nut compresses the threaded portion such that said inner sleeve is secured to said driven shaft and rotates with said driven shaft.

6. A roller assembly as set forth in claim 2 including a spring positioned between said lock nut and said roller.

7. A roller assembly as set forth in claim 6 wherein said lock nut includes a tapered section that compresses said threaded portion of said inner sleeve to secure said sleeve to said driven shaft such that said inner sleeve rotates with said driven shaft.

8. A roller assembly as set forth in claim 6 including a washer positioned between said lock nut and said roller, said washer having a tab thereon, said tab cooperating with said lock nut to prevent movement of said lock nut.

9. A roller assembly for use with a conveyor having a driven shaft comprising:

an inner sleeve disposed over said driven shaft, said inner sleeve having a threaded portion;

a roller disposed about said inner sleeve; and a tapered lock nut threadably engaged to said threaded portion of said inner sleeve, movement of said lock nut toward said roller exerting a force on both said threaded portion of said inner sleeve to secure said sleeve to said shaft such that said inner sleeve rotates with said shaft and said roller to create additional friction force between said roller and said inner sleeve.

10. A roller assembly as set forth in claim 9 including a beveled clamp ring acting against an inclined surface of said inner sleeve wherein said lock nut urges said beveled clamp ring against said inclined surface such that said clamp ring acts against an interior surface of said roller to create additional friction force between the roller and said inner sleeve.

11. A roller assembly as set forth in claim 9 including a spring disposed between said lock nut and said roller wherein said spring acts against said roller to create additional friction force between the roller and said inner sleeve.

12. A roller assembly as set forth in claim 9 including a washer positioned between said lock nut and said roller, said washer having a tab thereon to prevent movement of said lock nut.

* * * * *